Sept. 24, 1968  M. PESSON  3,403,159

PHENYLCYCLOHEXYLACETONITRILE DERIVATIVES

Filed Aug. 10, 1964

INVENTOR:
MARCEL PESSON

By Irish M. H. Radden

AGENT

United States Patent Office 3,403,159
Patented Sept. 24, 1968

3,403,159
PHENYLCYCLOHEXYLACETONITRILE
DERIVATIVES
Marcel Pesson, Paris, France, assignor to Societe anonyme dite: Laboratoire Roger Bellon, Neuilly-sur-Seine, Hauts-de-Seine, France, a French company
Filed Aug. 10, 1964, Ser. No. 388,476
Claims priority, application Great Britain, Aug. 16, 1963, 32,564/63
7 Claims. (Cl. 260—293)

This invention relates to derivatives of phenylacetonitrile.

The invention provides as new compounds α-phenyl-α-cyclohexyl-β-(N-ethyl - 2 - pyrrolidyl)-propionitrile conforming to the formula:

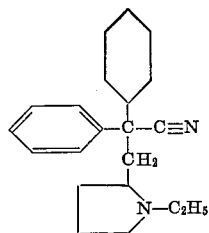

hereinafter called Compound I, and its acid addition salts, α-(N-ethyl - 3 - piperidyl)-α-cyclohexyl-phenylacetonitrile conforming to the formula:

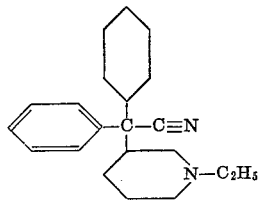

hereinafter called Compound II, and its acid addition salts, and mixtures of these compounds.

These are endowed with anti-tussive activity and show an appreciable spasmolytic action.

Pharmaceutical compositions containing at least one of the new compounds, in association with a pharmaceutically acceptable nontoxic support, are within the scope of the invention.

Figure 1:
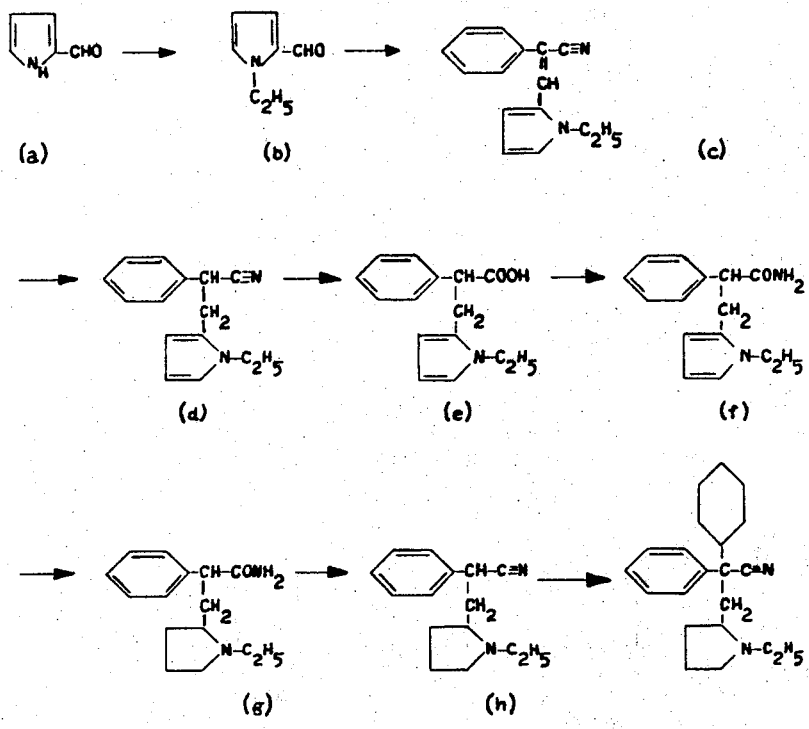

According to a feature of the invention, Compound I is prepared by the scheme of reactions shown in FIGURE 1 of the accompanying drawings.

In this preparation, there is used as starting material α-pyrrolaldehyde (a), which is ethylated on the nitrogen atom using, preferably, ethyl sulphate in solution in 4 N potassium hydroxide solution. N-ethylpyrrolaldehyde (b) is thus obtained and is condensed with benzyl cyanide in alkaline medium to obtain α-phenyl-β-(2-N-ethylpyrryl)-acrylonitrile (c). This compound is hydrogenated preferably with hydrogen in the presence of palladium and α-phenyl-β-(2-N-ethylpyrryl)propionitrile (d) is obtained, which is saponified to obtain the acid (e). This acid is converted into the corresponding amide (f) which, on hydrogenation, preferably in acetic acid in the presence of platinum, gives α-phenyl-β-(2-N-ethylpyrrolidyl)propionamide (g). This compound is dehydrated employing, for example, toluene-p-sulphonyl chloride in pyridine, and there is thus obtained the corresponding nitrile (h), the cyclohexylation of which, for example with cyclohexylbromide and potassium amide, gives Compound I.

Figure 2:
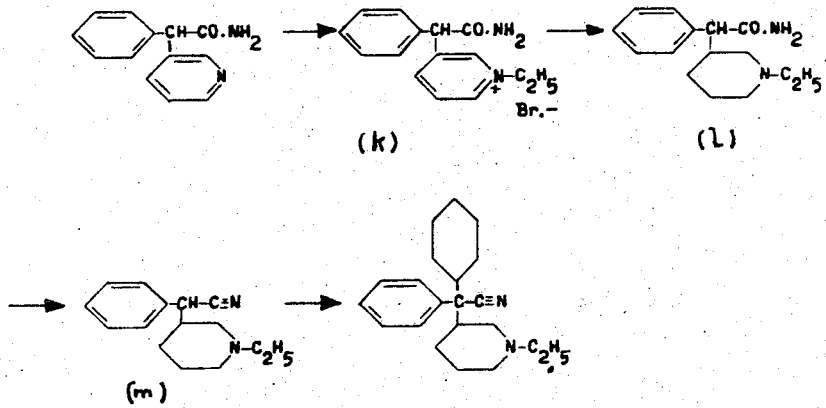

In accordance with a further feature of the invention Compound II is prepared by the scheme of reactions shown in FIGURE 2 of the accompanying drawings.

α-Phenyl-α-(3-pyridyl)acetamide used as starting material, is treated with ethyl bromide in dimethyl sulphoxide and there is obtained the ethobromide (k). This compound is hydrogenated under pressure (for example 70 kg./cm.²) preferably in alcoholic medium at a temperature of about 50° C. in the presence of Raney nickel. Phenyl-(3-N-ethylpiperidyl)acetamide (l) is thus obtained. This amide is dehydrated, for example with toluene-p-sulphonyl chloride, and the nitrile (m) is obtained, which is cyclohexylated preferably with cyclohexyl bromide in the presence of potassium amide to give Compound II.

According to a preferred feature of the invention, a mixture of Compounds I and II is prepared by reacting 1-ethyl-3-chloropiperidine either with an alkali metal, preferably potassium, derivative of phenylcyclohexyl-acetonitrile, or with an alkali metal derivative of benzyl cyanide, followed by cyclohexylation of the product. Under these conditions a mixture of the isomers I and II is obtained. It is known that in similar reactions, 1-ethyl-3-chloropiperidine can give either 1-ethyl-3-piperidine derivatives or 1-ethyl-2-methylpyrrolidine derivatives. It has not however yet proved possible to isolate Compounds I and II from the mixture of compounds obtained.

In carrying out the condensation of 1-ethyl-3-chloropiperidyl with phenylcyclohexylacetonitrile, the latter is preferably converted into its potassium derivative by the action of potassium amide in a neutral solvent, preferably toluene or xylene, and the reaction is completed by heating the mixture to boiling point in a solvent in which the metallic derivative is insoluble. The suspension obtained is stirred at normal temperature and 1-ethyl-3-chloropiperidine is slowly added thereto in a proportion of one molecule per molecule of nitrile employed. The mixture is stirred and heated under reflux until the reaction is complete. After cooling, the basic product is extracted with a dilute mineral acid. The base is thereafter liberated with an alkali metal hydroxide and extracted in an appropriate solvent. The solvent is driven off and the oil obtained is purified by distillation in a good vacuum.

Alternatively the sodium derivative of benzyl cyanide can first be condensed with 1-ethyl-3-chloropiperidine. In this way, a mixture of the nitriles (h) and (m) of FIGURES 1 and 2 is obtained. This mixture is thereafter treated with potassium amide in a neutral aromatic solvent and its alkylation with cyclohexylbromide is carried out as already described in connection with products (h) and (m). In this way, a mixture of Compounds I and II is obtained having substantially identical properties to those of the product of the reaction of 1-ethyl-3-chloropiperidine with phenylcyclohexylacetonitrile.

When the infra-red spectra of Compounds I and II are compared with that of the base obtained either by condensation of 1-ethyl-3-chloropiperidine with phenylcyclohexylacetonitrile or by condensation of cyclohexylbromide with the product of reaction of 1-ethyl-3-chloropiperidine with phenylacetonitrile, it is observed that the products obtained in the two condensations consist neither of pure compound I nor of pure compound II, but very probably of a mixture of these two compounds.

The pharmacodynamic properties of the mixture obtained by the condensation of 1-ethyl-3-chloropiperidine and phenylcyclohexyl-acetonitrile were compared with those of compounds I and II taken separately. For this purpose, the toxicity of the compounds was first studied by determining the $LD_{50}$ by the intravenous route in the mouse. The following values in mg. per kg. were obtained:

|  | Mg./kg. |
|---|---|
| Mixture produced by the condensation | 70/75 |
| Compound I | 75/80 |
| Compound II | 135 |

The anti-tussive action of the three compounds was determined using the test involving electric stimulation of the laryngeal nerve in the cat (Domenjoz's technique).

An intraperitoneal injection of 25 mg./kg. of Nembutal is given and the laryngeal nerves are carefully dissected. An electric excitation is thereafter produced by a stimulator at a rate of 5 to 10 per second for 5 to 10 seconds, the excitations (of 0.5 to 1 volt) being repeated for periods of at least 2 minutes. The movements of the abdominal region corresponding to breathing and to fits of coughing are recorded with a Marey device and the anti-tussive action is evaluated by determining the dose which causes these effects to disappear. The following values were thus obtained for the mixture and compounds I and II in the cat and the guinea pig.

|  | Cat (mg./kg.) | Guinea pig (mg./kg.) |
| --- | --- | --- |
| Mixture produced by the condensation | 2.5–5 | 5 |
| Compound I | 5–10 | Negative |
| Compound II | 5 | 5 |

In addition, the spasmolytic action of the compounds on the isolated duodenum of the rat in water at 37° C. was studied. A spasm was produced either by administration of acetylcholine in a concentration of about $10^{-7}$ or by administration of barium chloride in a concentration of $10^{-4}$. After washing, the dose of the substance to be tested was found which prevented the occurrence of further spasms. The concentrations of the compounds necessary to reduce by half the spasms set up by the two spasmogenic substances are given below.

|  | Barium chloride | Acetylcholine |
| --- | --- | --- |
| Mixture produced by the condensation | $6.10^{-7}$ | $6.10^{-7}$ |
| Compound I | $3.10^{-6}$ | $6.10^{-7}$ |
| Compound II | $10^{-6}$ | $10^{-6}$ |

These results show the mixture produced by the condensation has an anti-tussive activity comparable with that of codeine.

Under the experimental conditions of the tests, codeine phosphate was active in doses of 2.5 mg./kg. and 5 mg./kg. in the cat and the guinea pig respectively.

The mixture produced by the condensation appears to be more active than compounds I and II taken separately, its toxicity is low, and, when administered intraperitoneally its $LD_{50}$ is 250 mg./kg. and, when administered orally or subcutaneously, it is greater than 500 mg./kg. in the mouse. In addition, the mixture has no constipating action, unlike codeine, and in active doses has no harmful secondary effects on the respiratory system. It also has a potentiating effect on the hypnosis produced by barbiturates, and local anaesthetic activity.

The following non-limitative examples illustrate the invention.

Example 1.—Condensation of phenylcyclohexylacetonitrile with 1-ethyl-3-chloropiperidine In a two-necked spherical flask provided with a mechanical stirrer, a dropping funnel and a reflux condenser, 0.2 mol. of potassium amide is prepared in accordance with a known technique by the addition of 7.8 g. of potassium to 400 cc. of liquid ammonia in the presence of 0.3 g. of ferric nitrate as catalyst. To the potassium amide suspension thus obtained is added with stirring a solution of α-phenyl-α-cyclohexylacetonitrile (38 g., 0.2 mol.) in 240 cc. of anhydrous toluene. On completion of this addition, the excess of ammonia is eliminated by heating, and the toluenic solution is then heated under reflux for 45 minutes in order to complete the formation of the potassium derivative. The mixture is cooled to normal temperature, and 29.6 g. of 1-ethyl-3-chloropiperidine in solution in 40 cc. of anhydrous toluene are then added with stirring, in about 10 minutes. The mixture is heated for 4 hours under reflux with stirring. After cooling, the mixture is poured into 200 cc. of iced water and the organic phase is separated by decantation and then extracted with 2×50 cc. of 2 N hydrochloric acid. The acid extract is made strongly alkaline by the addition of sodium hydroxide solution and the oily precipitate formed is extracted with ether. The ethereal extract is washed with water and then dried over anhydrous magnesium sulphate. The solvent is driven off on the water bath and the oily residue is fractionated in vacuo.

There are obtained 41 g. of an oil which boils at 157–160° C. under 0.06 mm. Hg.

Analysis gives for $C_{21}H_{30}N_2$ (M.W.=310.47).—Calculated percent: C, 81.23; H, 9.74; N, 9.02. Found percent: C, 81.60; H, 9.90; N, 9.05.

Example 2.—Preparation of α-(N-ethyl-3-piperidyl)-α-cyclohexyl phenylacetonitrile 1st phase: N-ethylpyrrolaldehyde (b).—Into a three-necked 1-litre spherical flask provided with a mechanical stirrer, a reflux condenser and two dropping funnels are poured 19 g. of 2-pyrrolaldehyde (0.2 mol.) and 50 cc. of a 4 N potassium hydroxide solution. The mixture is stirred and heated to boiling point, whereafter there are simultaneously run into it through the two funnels, 92.4 g. of ethyl sulphate (0.6 mol.) and 175 cc. of 4 N potassium hydroxide, this addition lasting about 1 hour. When the addition is complete, the mixture is heated for 1 hour under reflux with vigorous stirring. After cooling, the oil formed is extracted with 3×100 cc. of ether and the ethereal extracts are washed with 50 cc. of 2 N KOH, and then with water and dried. The solvent is eliminated and the residue is fractionated in vacuo. There are obtained 19.2 g. of an oil which boils at 59–60° C. under 6 mm. Hg.

Analysis for $C_7H_9NO$ (M.W.=123.15) gives.—Calculated percent: C, 68.27; H, 7.37; N, 11.37. Found percent: C, 68.60; H, 7.42; N, 11.18.

2nd phase: α-phenyl-β-(2-N-ethylpyrryl)acrylonitrile (c).—A solution of benzyl cyanide (46.8 g., 0.4 mol.) and N-ethylpyrrolaldehyde (49.2 g., 0.4 mol.) in alcohol (80 cc.) is vigorously stirred. There are added thereto 20 cc. of 10% aqueous sodium hydroxide and the mixture is heated under reflux for 30 minutes. The mixture is allowed to return to normal temperature, at which it is stirred for a further 5 hours.

A yellow precipitate is thus obtained which is separated and washed with iced alcohol. The yield is 91% and, after recrystallisation from cyclohexane, the product melts at 86° C.

Analysis for $C_{15}H_{14}N_2$ (M.W.=222.28) gives.—Calculated percent: C, 81.05; H, 6.35; N, 12.60. Found percent: C, 81.18; H, 6.12; N, 12.74.

3rd phase: α - phenyl-β- 2-N-ethylpyrryl)propionitrile (d).—11.1 g. of the compound (c) in solution in 70 cc. of ethyl acetate are hydrogenated at normal pressure and temperature (20° C.) in the presence of 2.5 g. of 5% palladium charcoal. After absorption of 1600 cc. of hydrogen, the rate of hydrogenation is greatly reduced (volume calculated for one molecule=1,210 cc.).

The solution is filtered, washed by decantation with 10 cc. of 2 N HCl (in order to remove a small quantity of basic impurities) and then with water, and dried over anhydrous sodium sulphate. The solvent is driven off and the residue is fractionated in vacuo.

There is obtained, in a yield of 77%, an oil having a boiling point under 0.1 mm. Hg of 135–137° C.

Analysis for $C_{15}H_{16}N_2$ (M.W.=224.29) gives.—Calculated percent: C, 80.32; H, 7.19; N, 12.49. Found percent: C, 80.35; H, 7.16; N, 12.49.

4th phase: α-phenyl-β-(2-N-ethylpyrryl)propionic acid (e).—26.8 g. (0.12 mol.) of the preceding nitrile (d) and 260 cc. of 20% alcoholic potassium hydroxide are heated for 5 hours under reflux. The alcohol is driven off on the water bath in vacuo and the residue is dissolved in 300 cc. of water. The alkaline solution is extracted with 100 cc. of ether, treated with animal charcoal, and filtered and then acidified with 2 N hydrochloric acid. The precipitated acid is separated, washed with water and dried.

The desired product is obtained in a yield of 94%. After purification by recrystallisation from cyclohexane, it melts at 86° C.

Analysis for $C_{15}H_{17}NO_2$ (M.W.=243.29) gives.—Calculated percent: C, 74.05; H, 7.04; N, 5.76. Found percent: C, 73.83; H, 6.94; N, 5.75.

5th phase: α-phenyl-β-(2-N-ethylpyrryl)propionamide (f).—In a two-necked spherical flask provided with a soda-lime trap, a stirrer, a dropping funnel and a thermometer are dissolved 48.6 g. of α-phenyl-β-(2-N-ethylpyrryl)propionic acid (0.2 mol.) and 20.2 g. of triethylamine (0.2 mol.) in 450 cc. of anhydrous chloroform. The solution is stirred and externally cooled with an ice-salt bath. 21.7 g. of ethyl chloroformate are added drop-by-drop through the dropping funnel care being taken that the temperature of the reaction mixture remains between 0° and 5° C. Stirring is continued at this temperature for 45 minutes after the end of the addition of the chloroformate, and the cooled solution is then saturated with a current of anhydrous gaseous ammonia. The cooling mixture is removed, and stirring is continued for four more hours at ambient temperature. After standing overnight, the solution is filtered and washed with a 2 N hydrochloric acid solution, with dilute sodium hydroxide and with water, and then dried. After purification by recrystallisation from isopropyl ether, the product melts at 82° C., and is obtained in a yield of 43.6 g.

Analysis for $C_{15}H_{18}N_2O$ (M.W.=242.31) gives.—Calculated percent: C, 74.35; H, 7.49; N, 11.56. Found percent: C, 74.70; H, 7.57; N, 11.64.

6th phase: α-phenyl-β-(N-ethyl-2-pyrrolidyl)propionamide (g).—24.2 g. of the preceding amide (0.1 mol.) in solution in 130 cc. of acetic acid are hydrogenated at normal pressure and temperature in the presence of platinum obtained by the reduction of 3 g. of platinum oxide prepared by Adam's procedure. (Volume of hydrogen absorbed at 20° C.: 5,040 cc.; volume calculated for 2 molecules: 4,790 cc.)

The solution is filtered and concentrated on the water bath in vacuo. The residue is dissolved in 200 cc. of N hydrochloric acid and the solution is extracted with ether and then made alkaline with sodium hydroxide solution. The precipitate is separated and dried at normal temperature in vacuo over phosphorus pentomide, 23 g. of a product which is purified by a number of recrystallisations from isopropyl ether are obtained. After recrystallisation, there are obtained 12 g. of white crystals melting at 114° C.

Analysis for $C_{15}H_{22}N_2O$ (M.W.=246.34) gives.—Calculated percent: C, 73.13; H, 9.00; N, 11.37. Found percent: C, 72.81; H, 8.89; N, 11.28.

7th phase: α-phenyl-β-(N-ethyl-2-pyrrolidyl)propionitrile (h).—12.3 g. of the amide (g) are dissolved in 50 cc. of pyridine dried over potassium hydroxide. To this vigorously agitated solution are added in small portions 19 g. of toluene-para-sulphonylchloride, and the mixture is then heated under reflux for 3 hours. After cooling, the mixture is poured into iced water, the solution is made alkaline by the addition of sodium hydroxide solution, the oil formed is extracted with ether and the ethereal solution is washed with water and then dried over anhydrous magnesium sulphate. The solvent is driven off on the water bath and the residue is fractionated in vacuo. 9 g. of an oil which boils at 108–109° C. under 0.05 mm. Hg are thus obtained.

Analysis for $C_{15}H_{20}N_2$ (M.W.=228.33) gives.—Calculated percent: C, 78.90; H, 8.83; N, 12.27. Found percent: C, 78.84; H, 9.10; N, 12.05.

8th phase: α-cyclohexyl-α-phenyl-β-(N-ethyl-2-pyrrolidyl)propionitrile.—A suspension of amide prepared from 3.9 g. of potassium, 200 cc. of liquid ammonia and 0.2 g. of ferric nitrate is vigorously stirred and a solution of α-phenyl-β-(N-ethyl-2-pyrrolidyl)propionitrile in solution in 120 cc. of anhydrous toluene is added thereto drop-by-drop. The excess of ammonia is driven off by gentle heating, and the toluene solution is then heated for 30 minutes under reflux. After cooling, 16.3 g. of cyclohexyl bromide in solution in 20 cc. of anhydrous toluene are added and the mixture is then heated under reflux for 4 hours with stirring.

After cooling, the mixture is poured into 200 cc. of water and the organic phase is separated by decantation and extracted with 2×15 cc. of 2 N hydrochloric acid. The acid solution is made alkaline with sodium hydroxide solution, the oil formed is extracted with ether and the etheral solution is dried over anhydrous magnesium sulphate. When the solvent has been driven off, there remains an oil contaminated by a small quantity of a solid product, which is separated by dissolving the whole in 100 cc. of hexane. The product is filtered to separate the insoluble matter, the solvent is driven off and the residue is fractionated under a good vacuum. There are obtained 18.2 g. of an oil which boils at 158/163° C. under 0.07 mm. Hg.

Analysis for $C_{21}H_{30}N_2$ (M.W.=310.47) gives.—Calculated percent: C, 81.23; H, 9.74; N, 9.02. Found percent: C, 80.90; H, 9.96; N, 9.15.

Example 3.—1st phase: α-phenyl-α-(3-pyridyl)acetamide ethobromide (k).—A solution of 86.9 g. of α-phenyl-α-(3-pyridyl)acetamide and 123 cc. of ethyl bromide in 300 cc. of dimethyl sulphoxide is stirred for 24 hours at ambient temperature and then poured into one litre of benzene. The quaternary ammonium salt precipitates as a viscous mass, which is separated by decantation and is crystallised by trituration with acetone. The product is separated, dried and recrystallised from isopropanol. 87 g. of a product which melts at 162° C. are thus obtained.

Analysis for $C_{15}H_{17}BrN_2O$ (M.W.=321) gives.—Calculated percent: C, 56.08; H, 5.33; N, 8.72; Br, 24.87. Found percent: C, 55.47; H, 5.42; N, 8.43; Br, 24.32.

2nd phase: α-phenyl-α-(N-ethyl-3-piperidyl)acetamide (l).—32.1 g. of product (k) in solution in 300 cc. of ethanol are hydrogenated under pressure (70 kg./cm²) at 60° C. in the presence of Raney nickel (20 g.) for 4 hours. After cooling, the solution is filtered and evaporated to dryness, and the residue is dissolved in 100 cc. of water. The solution is made alkaline by the addition of sodium carbonate and the oil formed is extracted with ethyl acetate. The organic solution is rapidly dried (over anhydrous magnesium sulphate), the solvent is driven off in vacuo and the residue is recrystallised from benzene (110 cc.). In the course of a second recrystallisation from benzene (110 cc.) a small quantity (0.15 g.) of a less soluble product is isolated, which melts at 182° C. The main fraction, again recrystallised from benzene, gives 14.3 g. of a product which melts at 150–151° C.

Analysis for $C_{15}H_{22}N_2O$ (M.W.=246.34) gives.—Calculated percent: C, 73.13; H, 9.00; N, 11.37. Found percent: C, 73.50; H, 9.20; N, 11.30.

The small quantity of product of high melting point (182° C.) recrystallised twice from benzene retains the same melting point. Its analysis is identical with that of the amide which melts at 150–151° C. (found C, 73.24; H, 8.95; N, 11.56). It is possible that these products correspond to the two theoretically possible stereoisomeric amides, this stereoisomerism being due to the presence in the structure of two adjacent asymmetrical carbon atoms. By carrying out the hydrogenation at normal temperature (pressure 9.5 kg./cm²) in acetic acid in the presence of Adam's platinum, only one amide is isolated, melting at 150–151° C.

3rd phase: α-phenyl-α-(N-ethyl-3-piperidyl)acetonitrile (m).—A solution of the amide (l) (12.3 g.) in pyridine (50 cc.) is vigorously stirred. There are added thereto in small fractions 19 g. of toluene-para-sulphonylchloride, and the mixture is heated under reflux for 3 hours. After cooling, the mixture is poured into iced water, the solution is made alkaline with sodium hydroxide solution, and the oil formed is extracted with ether. The ethereal solution is washed with water and dried over anhydrous magnesium sulphate. After elimination of the solvent, the remaining oil is fractionated in vacuo.

There are thus obtained 9 g. of an oil which boils at 116/117° C. under 0.07 mm. Hg.

Analysis for $C_{15}H_{20}N_2$ (M.W.=228.33) gives.—Calculated percent: C, 78.90; H, 8.83; N, 12.27. Found percent: C, 78.93; H, 9.01; N, 12.23.

4th phase: α-phenyl-α-cyclohexyl(N-ethyl-3-piperidyl)-acetonitrile.—A suspension of potassium amide prepared in accordance with Example 1 from 2.4 g. of potassium, 200 cc. of liquid ammonia and 0.2 g. of ferric nitrate is vigorously stirred. A solution of 14.1 g. of the nitrile (m) in solution in 120 cc. of anhydrous toluene is added thereto. The ammonia is driven off by gentle heating and the mixture is heated for 30 minutes under reflux. After cooling, there are added, with stirring, 10 g. of cyclohexyl bromide in solution in 20 cc. of toluene and the mixture is refluxed for 4 hours with stirring. After cooling, the product is poured into 300 cc. of water. The organic phase is separated and extracted with 2×15 cc. of 2 N hydrochloric acid. The acid solution is made alkaline with sodium hydroxide solution and the oil formed is extracted with ether. The solution is dried over anhydrous magnesium sulphate. The solvent is driven off, the remaining oil is taken up in 150 cc. of hexane, the solution is filtered to separate insoluble matter, the solvent is driven off and the residue is fractionated. There are thus obtained 9.2 g. of an oil boiling at 145/151° C. under 0.04 mm. Hg.

Analysis for $C_{21}H_{30}N_2$ (M.W.=310.47) gives.—Calculated percent: C, 81.23; H, 9.74; N, 9.02. Found percent: C, 80.80; H, 9.54; N, 8.95.

Example 4

To sodamide obtained from 500 cc. of liquid ammonia, 6.9 g. of sodium and 0.3 g. of ferric nitrate are added, under conditions similar to those described in Example 1, 35.1 g. of benzyl cyanide (0.3 mol.) in solution in 300 cc. of anhydrous toluene. After elimination of the ammonia, 44.4 g. of 1-ethyl-3-chloropiperidine are added and the mixture is heated under reflux for 3 hours. After cooling, the reaction product is isolated as in Example 1. The oil obtained after evaporation of the ether contains a small quantity of a crystalline product which is separated by treatment with hexane, in which the solid (identified as phenyl acetamide) is insoluble. After evaporation of the hexane, the remaining oil is fractionated in vacuo. It boils at 111–112° C. under 0.01 mm. Hg.

Analysis for $C_{15}H_{20}N_2$ (M.W.=228.32) gives.—Calculated percent: C, 78.90; H, 8.83; N, 12.27. Found percent: C, 78.14; H, 8.99; N, 12.35.

Hydrolysis of this nitrile (4.6 g.) at 60–70° C. for 4 hours with 75%-by-volume sulphuric acid gives a mixture of amides from which it is possible to isolate an amide (M.P.=151–152° C.) identical to the amide of structure (k), an amide (M.P.=182° C.) corresponding to the isomer of the preceding amide already described (Example 3(2)) and a third amide (M.P.=114° C.) identical with the amide (g). These results show that the nitrile consists of a mixture of nitriles (h) and (m).

This mixture of nitriles (22.8 g.) dissolved in 120 cc. of toluene is converted into its potassium derivative in accordance with the method previously described by the action of potassium amide prepared from 3.9 g. of metal, 200 cc. of liquid ammonia and 0.2 g. of ferric nitrate. After evaporation of the ammonia, the product is heated under reflux for 30 minutes, 16.3 g. of cyclohexyl bromide in solution in 20 cc. of toluene are added, the mixture is heated under reflux for 4 hours and the product of the reaction is isolated as described above by treating the crude product with hexane to eliminate a small quantity of amide, which is a by product of the reaction. An oil which boils at 173/175° C. under 0.4–0.5 mm. Hg is thus obtained.

Analysis for $C_{21}H_{30}N_2$ (M.W.=310.47) gives.—Calculated percent: C, 81.23; H, 9.74; N, 9.02. Found percent: C, 80.96; H, 9.73; N, 9.14.

This product has similar properties to the product obtained in accordance with Example 1, notably in its pharmacodynamic actions. In addition, its infra-red spectrum is substantially identical with that of the product obtained in accordance with Example 1.

I claim:

1. An α-phenyl-α-cyclohexyl acrylonitrile compound selected from the group consisting of α-phenyl-α-cyclohexyl-β-(N-ethyl-2-pyrrolidyl) propionitrile, phenyl cyclohexyl-(N-ethyl-3-piperidyl) acetonitrile, and their substantially non-toxic acid addition salts, said compounds having a high antitussive activity.

2. α - Phenyl - α - cyclohexyl - β - (N - ethyl - 2 - pyrrolidyl) propionitrile of the formula

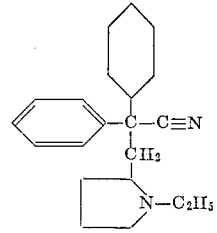

said compound having a high antitussive activity.

3. The substantially non-toxic acid addition salts of the compound of claim 2.

4. Phenyl - cyclohexyl - (N - ethyl - 3 - piperidyl) acetonitrile of the formula

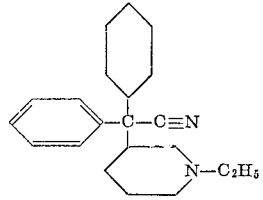

said compound having a high antitussive activity.

5. The substantially non-toxic acid addition salts of the compound of claim 4.

6. Process for the preparation of α-phenyl-α-cyclohexyl - β - (N - ethyl - 2 - pyrrolidyl)propionitrile, which comprises alkylating α-pyrrolaldehyde on the nitrogen atom with diethyl sulphate in potassium hydroxide solution to form N-ethyl-pyrrolaldehyde, condensing the latter compound with benzyl cyanide in alkaline medium to obtain α - phenyl - β - (N - ethyl - 2 - pyrryl)acrylonitrile, hydrogenating the condensate in the presence of a palladium catalyst to produce α-phenyl-β-(N-ethyl-2-pyrryl) propionitrile, hydrolysing this nitrile to obtain the corresponding acid, converting the acid into the corresponding amide, hydrogenating this amide in acetic acid medium in the presence of platinum to obtain α-phenyl-β-(N-ethyl-2-pyrrolidyl)propionamide, dehydrating the amide with toluene-p-sulphonyl chloride in pyridine medium to obtain the corresponding nitrile, and alkylating the latter with cyclohexyl bromide and potassium amide to give α - phenyl - α - cyclohexyl - β - (N - ethyl - 2 - pyrrolidyl) propionitrile.

7. Process for the preparation of N-ethyl-3-piperidyl-cyclohexyl-phenyl-acetonitrile, which comprises reacting α-phenyl-α-(3-pyridyl)acetamide with ethyl bromide in solution in dimethylsulphoxide to obtain the corresponding ethobromide, hydrogenating this compound under pressure in alcoholic medium in the presence of Raney nickel to obtain α-phenyl-N-ethyl-3-piperidyl-acetamide, dehydrating this amide with toluene-p-sulphonyl chloride to obtain the nitrile, and alkylating the nitrile with cyclohexyl bromide in the presence of potassium amide to obtain N - ethyl - 3 - piperidyl - cyclohexyl - phenyl - acetonitrile.

References Cited

UNITED STATES PATENTS

| | | | |
|---|---|---|---|
| 2,649,455 | 8/1953 | Walter et al. | 260—293 |
| 2,769,812 | 11/1956 | Ruddy | 260—293 |
| 3,192,230 | 6/1965 | Lunsford et al. | 260—243 |
| 2,566,535 | 9/1951 | Ruddy | 260—326.62 |
| 2,782,206 | 2/1957 | Aspergren | 260—326.62 |
| 2,851,458 | 9/1958 | Billinghurst | 260—326.62 |

FOREIGN PATENTS 589,625   6/1947   Great Britain.

OTHER REFERENCES

Biel et al., J. Am. Chem. Soc. vol. 77, pp. 2250–2256 (1955).

Ames, J. Chem. Soc. (1960) pp. 2780 and 2781.

NORMA S. MILESTONE, *Primary Examiner.*

E. D. LEWIS, *Assistant Examiner.*